United States Patent
Takahashi

(10) Patent No.: US 11,763,561 B2
(45) Date of Patent: Sep. 19, 2023

(54) INFORMATION PROCESSING APPARATUS, INFORMATION PROCESSING METHOD, AND PROGRAM

(71) Applicant: NEC Corporation, Tokyo (JP)

(72) Inventor: Katsuhiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 17/414,015

(22) PCT Filed: Dec. 26, 2018

(86) PCT No.: PCT/JP2018/047868
§ 371 (c)(1),
(2) Date: Jun. 15, 2021

(87) PCT Pub. No.: WO2020/136761
PCT Pub. Date: Jul. 2, 2020

(65) Prior Publication Data
US 2022/0058395 A1  Feb. 24, 2022

(51) Int. Cl.
*G06V 20/40* (2022.01)
*G06F 18/40* (2023.01)
*G06F 18/21* (2023.01)

(52) U.S. Cl.
CPC ............ *G06V 20/41* (2022.01); *G06F 18/217* (2023.01); *G06F 18/40* (2023.01); *G06V 20/44* (2022.01)

(58) Field of Classification Search
CPC ...... G06V 20/41; G06V 20/44; G06V 10/776; G06V 20/52; G06F 18/217; G06F 18/40;
(Continued)

(56) References Cited

U.S. PATENT DOCUMENTS

2002/0102526 A1  8/2002  Tsukamoto
2005/0125403 A1  6/2005  Wakabayashi
(Continued)

FOREIGN PATENT DOCUMENTS

JP  2002222083 A  8/2002
JP  2005173668 A  6/2005
(Continued)

OTHER PUBLICATIONS

International Search Report for PCT Application No. PCT/JP2018/047868, dated Mar. 26, 2019.

*Primary Examiner* — Amara Abdi

(57) ABSTRACT

An information processing apparatus (10) includes an event detection unit (110), an input reception unit (120), and a processing execution unit (130). The event detection unit (110) detects a specific event from video data. The input reception unit (120) receives, from a user, input for specifying processing to be executed. The processing execution unit (103) executes first processing specified by input received by the input reception unit (120), and executes second processing of generating learning data used for machine learning and storing the generated learning data in a learning data storage unit (40). The processing execution unit (130) discriminates, in the second processing, based on a classification of the first processing specified by input received by the input reception unit (120), whether a detection result of a specific event is correct, and generates learning data including at least a part of video data, category information indicating a category of a specific event detected by the event detection unit (110), and correct/incorrect information indicating whether a detection result of an specific event is correct or incorrect.

14 Claims, 12 Drawing Sheets

(58) Field of Classification Search
CPC .......... G06N 20/00; G06T 2207/10016; G06T 2207/20081; G06T 2207/30232; G06T 7/00; G08B 13/19613; H04N 7/183
See application file for complete search history.

(56) References Cited

U.S. PATENT DOCUMENTS

| | | |
|---|---|---|
| 2008/0193010 A1 | 8/2008 | Eaton et al. |
| 2014/0062866 A1* | 3/2014 | Yamashita ............. G06V 10/56 |
| | | 345/156 |
| 2016/0132731 A1* | 5/2016 | Hisada ................... H04N 7/181 |
| | | 382/103 |

FOREIGN PATENT DOCUMENTS

| | | | |
|---|---|---|---|
| JP | 2005176077 A | 6/2005 | |
| JP | 2010518522 A | 5/2010 | |
| JP | 2016192007 | * 11/2016 | ............. G06F 17/30 |
| JP | 2016192007 A | 11/2016 | |
| JP | 2017225122 A | 12/2017 | |

* cited by examiner

FIG. 4

| SPECIFIED FIRST PROCESSING | CORRECT/ INCORRECT DETERMINATION OF DETECTION RESULT |
|---|---|
| REPORT PROCESSING TO PREDETERMINED ADDRESS | CORRECT |
| PROCESSING OF STARTING ALARM APPARATUS | CORRECT |
| PROCESSING OF MODIFYING DISPLAY AREA OF VIDEO DATA | CORRECT |
| PROCESSING OF SELECTING PARTIAL AREA OF VIDEO DATA | CORRECT |
| PROCESSING OF STARTING RECORDING VIDEO DATA | CORRECT |
| PROCESSING OF STOPPING RECORDING VIDEO DATA AND STORING RECORDED DATA | CORRECT |
| ⋮ | ⋮ |
| PROCESSING OF RETURNING TO MODE FOR DETECTING SPECIFIC EVENT | INCORRECT |
| PROCESSING OF STOPPING RECORDING VIDEO DATA AND DISCARDING RECORDED VIDEO DATA | INCORRECT |
| ⋮ | ⋮ |

INFORMATION PROCESSING APPARATUS, INFORMATION PROCESSING METHOD, AND PROGRAM

This application is a National Stage Entry of PCT/JP2018/047868 filed on Dec. 26, 2018, the contents of all of which are incorporated herein by reference, in their entirety.

TECHNICAL FIELD

The present invention relates to a technique for assisting image recognition using machine learning.

BACKGROUND ART

In a video solution using video data, a discriminator constructed by using machine learning may be used. In a discriminator and machine learning constructing thereof, preliminary preparation work that generates a large number of pieces of learning data is required.

One example of a technique for assisting work that generates learning data is disclosed, for example, in PTL 1 described below. PTL 1 described below discloses a technique for displaying, together with video data of a surveillance camera, a category setting screen for setting a category of an event included in the video data and storing, as learning data, category information set according to an operation of an operator on the screen and the video data.

CITATION LIST

Patent Literature

[PTL 1] Japanese Patent Application Publication No. 2017-225122

SUMMARY OF INVENTION

Technical Problem

With regard to preparation work for learning data used for machine learning, commonly, as in a technique of PTL 1, work for providing a learning image and information indicating what image the image is manually executed. The preparation work for learning data is applied with a large load on a person in charge.

The present invention has been made in view of the problem. One object of the present invention is to provide a technique for reducing a load of generation work for learning data used for machine learning.

Solution to Problem

An information processing apparatus according to the present invention includes:
an event detection unit that detects a specific event from video data;
an input reception unit that receives, from a user, input for specifying processing to be executed; and
a processing execution unit that executes first processing specified by the input and executes second processing of generating learning data used for machine learning and storing the generated learning data in a storage apparatus, wherein
the processing execution unit, in the second processing,
discriminates, based on a classification of the first processing specified by the input, whether a detection result of the specific event is correct, and
generates the learning data including at least a part of the video data, category information indicating a category of the detected specific event, and correct/incorrect information indicating whether the detection result of the specific event is correct or incorrect.

An information processing method executed by a computer according to the present invention includes:
detecting a specific event from video data;
receiving, from a user, input for specifying processing to be executed; and
executing first processing specified by the input and executing second processing of generating learning data used for machine learning and storing the generated learning data in a storage apparatus, wherein
the second processing includes
discriminating, based on a classification of the first processing specified by the input, whether a detection result of the specific event is correct, and
generating the learning data including at least a part of the video data, category information indicating a category of the detected specific event, and correct/incorrect information indicating whether the detection result of the specific event is correct or incorrect.

A program according to the present invention causes a computer to execute the above-described information processing method.

Advantageous Effects of Invention

According to the present invention, time and effort required for generation work of learning data used for machine learning can be reduced.

BRIEF DESCRIPTION OF DRAWINGS

The above-described object, other objects, features, and advantageous effects will become more apparent from preferred example embodiments described below and the following accompanying drawings.

FIG. 4 is a diagram illustrating one example of information for determining, based on first processing specified as processing to be executed, whether a detection result of a specific event based on an event detection unit is correct or incorrect.

EXAMPLE EMBODIMENT

Hereinafter, example embodiments according to the present invention are described by using the accompanying drawings. Note that, in all drawings, a similar component is assigned with a similar reference sign and description thereof is omitted, as appropriate. Further, unless otherwise described, in each block diagram, each block does not indicate a configuration of a hardware unit but indicates a configuration of a function unit.

First Example Embodiment

<Functional Configuration>

Figure 1:
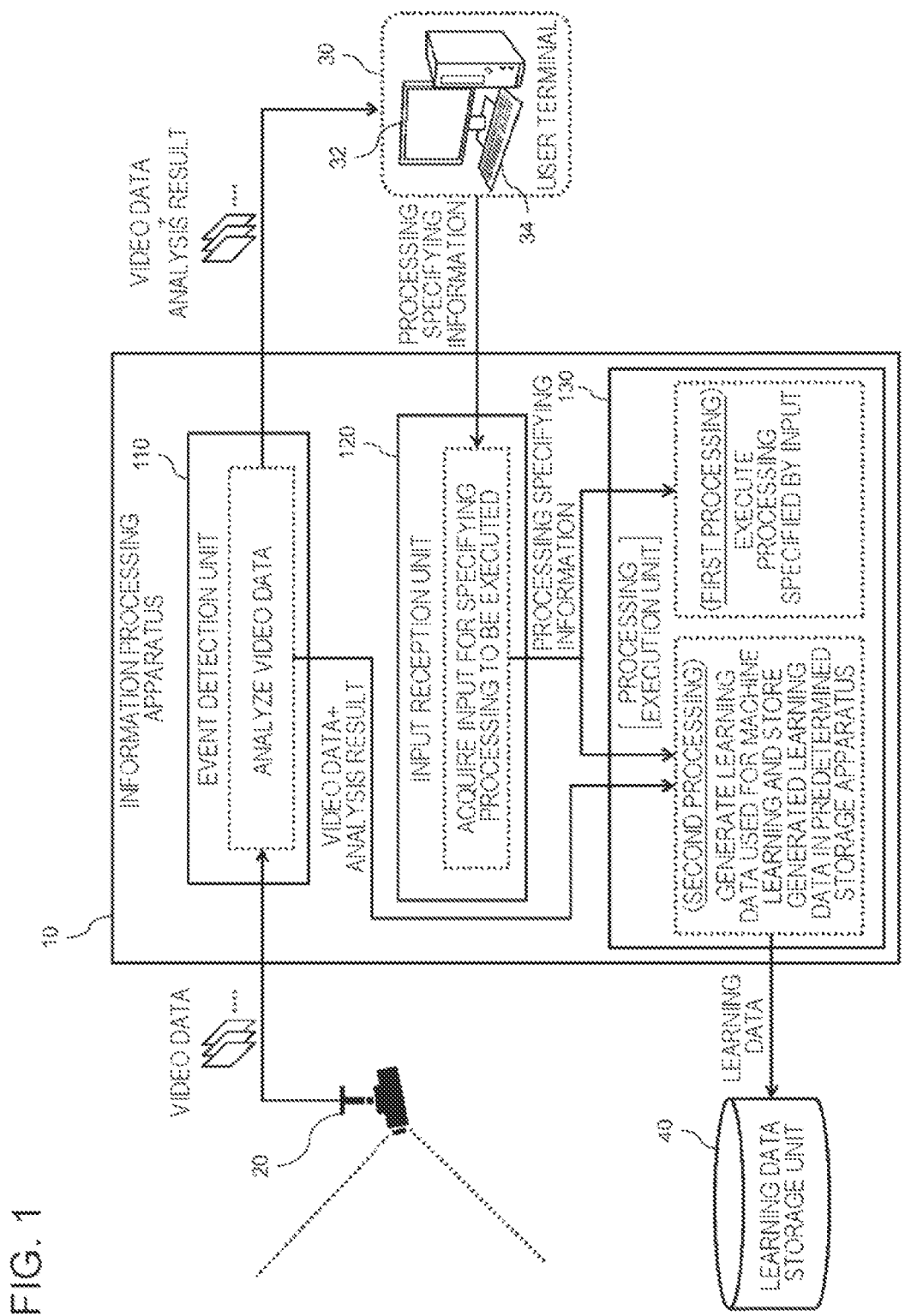
FIG. 1 is a diagram schematically illustrating a functional configuration of an information processing apparatus according to a first example embodiment and a flow of processing executed by the information processing apparatus.

By using FIG. 1, a basic operation according to the present invention is described. FIG. 1 is a diagram schematically illustrating a functional configuration of an information processing apparatus 10 according to a first example embodiment and a flow of processing executed by the information processing apparatus 10. Note that, a direction of an arrow in the present figure is intended to easily understand a flow of processing and does not limit a direction of communication (unidirectional communication/bidirectional communication).

In the example of FIG. 1, the information processing apparatus 10 is connected, via a network that is not illustrated, to an image-capture apparatus 20, a user terminal 30, and a learning data storage unit 40. The image-capture apparatus 20 is, but not specifically limited to, a surveillance camera or the like installed in a town or a building. The user terminal 30 is a terminal used by a person (hereinafter, referred to also as a "user") who executes an operation by using video data generated by the image-capture apparatus 20. The user terminal 30 is, for example, a stationary personal computer (PC) or a mobile terminal such as a tablet terminal, a smartphone, and the like. The user terminal 30 includes a user display 32 for displaying video data and a processing result based on the information processing apparatus 10 and a user input apparatus 34 such as a keyboard, a mouse, a touch panel, and the like. The learning data storage unit 40 is an apparatus for storing learning data used for machine learning. Learning data used for machine learning, although being described later in detail, are generated by the information processing apparatus 10. In the example of the present figure, the learning data storage unit 40 is provided outside the information processing apparatus 10, but without limitation to this case, the learning data storage unit 40 may be included in the information processing apparatus 10.

As illustrated in FIG. 1, the information processing apparatus 10 includes an event detection unit 110, an input reception unit 120, and a processing execution unit 130.

The event detection unit 110 analyzes video data and detects a specific event from the video data. The event detection unit 110 is configured to be able to detect one type or a plurality of types of specific events. An analysis result of the video data based on the event detection unit 110 is transmitted, together with video data generated by the image-capture apparatus 20, to the user terminal 30 and is displayed on the user display 32.

Herein, a specific event detected by the event detection unit 110 includes at least any one of a person, an object, and a behavior of a person or an object matched with a predetermined condition. As one example, when video data generated by the image-capture apparatus 20 are used for a surveillance operation in a town or a building, the event detection unit 110 detects, from the video data, as a specific event, a criminal behavior (including a behavior that may lead to a crime) by an unspecified person or vehicle, a specific person or vehicle (e.g., a wanted person or vehicle), or the like.

The input reception unit 120 receives, from a user, input of information (hereinafter, referred to also as "processing specifying information") specifying processing to be executed. Processing specifying information is generated, for example, as described below, in response to an input operation of a user using the user input apparatus 34. First, a user checks a display content of the user display 32 and determines processing to be executed for a specific event detected by the event detection unit 110. Then, a user executes, by using the user input apparatus 34, an input operation for executing the processing. The user terminal 30 generates, based on the input operation of the user received via the user input apparatus 34, processing specifying information and transmits the generated information to the information processing apparatus 10. The processing specifying information received by the input reception unit 120 is transferred to the processing execution unit 130.

The processing execution unit 130 executes the above-described processing specified by the input from the user, and executes processing of generating learning data used for machine learning and of storing the generated learning data in a predetermined storage apparatus (the learning data storage unit 40). In the following, the former processing is referred to as "first processing", and the latter processing is referred to as "second processing".

<<First Processing>>

The first processing is processing executed in a usual operation assigned to a user. Processing of generating learning data in machine learning is not categorized into the first processing. For example, processing of manually providing, to various images previously prepared, a label (information indicating a class to which the image belongs among a plurality of previously defined classes) as preliminary preparation of machine learning for constructing a discriminator that discriminates any object from an image is not included in first processing.

Herein, the first processing can be classified into processing executed by assuming that a detection result of a specific event based on the event detection unit 110 is correct and processing executed by assuming that a detection result of a specific event based on the event detection unit 110 is incorrect. In the following description, the former processing is referred to also as "positive processing", and the latter processing is referred to also as "negative processing". Hereinafter, for the first processing, several specific examples are described. However, the first processing is not limited to the following examples.

When, for example, a user is in charge of handling an operation for conducting surveillance by using video data in a town and a building, as positive processing, included is, for example, at least one of (1) report processing to a predetermined address (a communication device or the like carried by a person in charge conducting a surveillance operation at a site), (2) processing of starting an alarm apparatus provided in a place relevant to video data, (3) processing of modifying a display area of video data (e.g., processing of enlarging or positioning, to a center, an area where a specific event is captured in response to input via the user input apparatus 34, or the like), (4) processing of selecting a partial area of video data (e.g., processing of cutting out an area where a specific event is captured in response to input via the user input apparatus 34, or the like), (5) processing of starting recording video data in response to input via the user input apparatus 34, and (6) processing of stopping, when recording of video data is automatically started in response to detection of a specific event, recording the video data in response to input via the user input apparatus 34 and storing recorded data. Further, in this case, as negative processing, included is, for example, at least either of (1) processing of returning to a mode for detecting a specific event without executing the above-described positive processing in response to input or the like of pressing a button for ignoring or cancelling a detection result of a specific event, and (2) processing of stopping, when recording of video data is automatically started in response to detection of a specific event, recording the video data in response to input via the user input apparatus 34 and discarding recorded data.

<<Second Processing>>

The processing execution unit 130 operates as described below in the second processing. First, the processing execution unit 130 discriminates, based on a classification of first processing specified by the above-described input, whether a detection result of a specific event based on the event detection unit 110 is correct. The processing execution unit 130 discriminates, when first processing specified by input is classified into positive processing, for example, as in the above-described examples, that a detection result of a specific event based on the event detection unit 110 is correct. On the other hand, the processing execution unit 130 discriminates, when first processing specified by input is classified into negative processing, for example, as in the above-described examples, that a detection result of a specific event based on the event detection unit 110 is incorrect.

Then, the processing execution unit 130 generates learning data used for machine learning including, at least, at least a part of video data as an analysis target, category information indicating a category of a specific event detected by the event detection unit 110, and information (hereinafter, referred to also as "correct/incorrect information") indicating whether a detection result of the specific event is correct or incorrect. The processing execution unit 130 stores the generated learning data used for machine learning in the learning data storage unit 40.

Hardware Configuration Example

The information processing apparatus 10 may be achieved by hardware (e.g., a hard-wired electronic circuit) achieving each functional configuration unit, or may be achieved by a combination of hardware and software (e.g., a combination of an electronic circuit and a program controlling the electronic circuit). Hereinafter, a case where the information processing apparatus 10 is achieved by a combination of hardware and software is further described.

Figure 2:
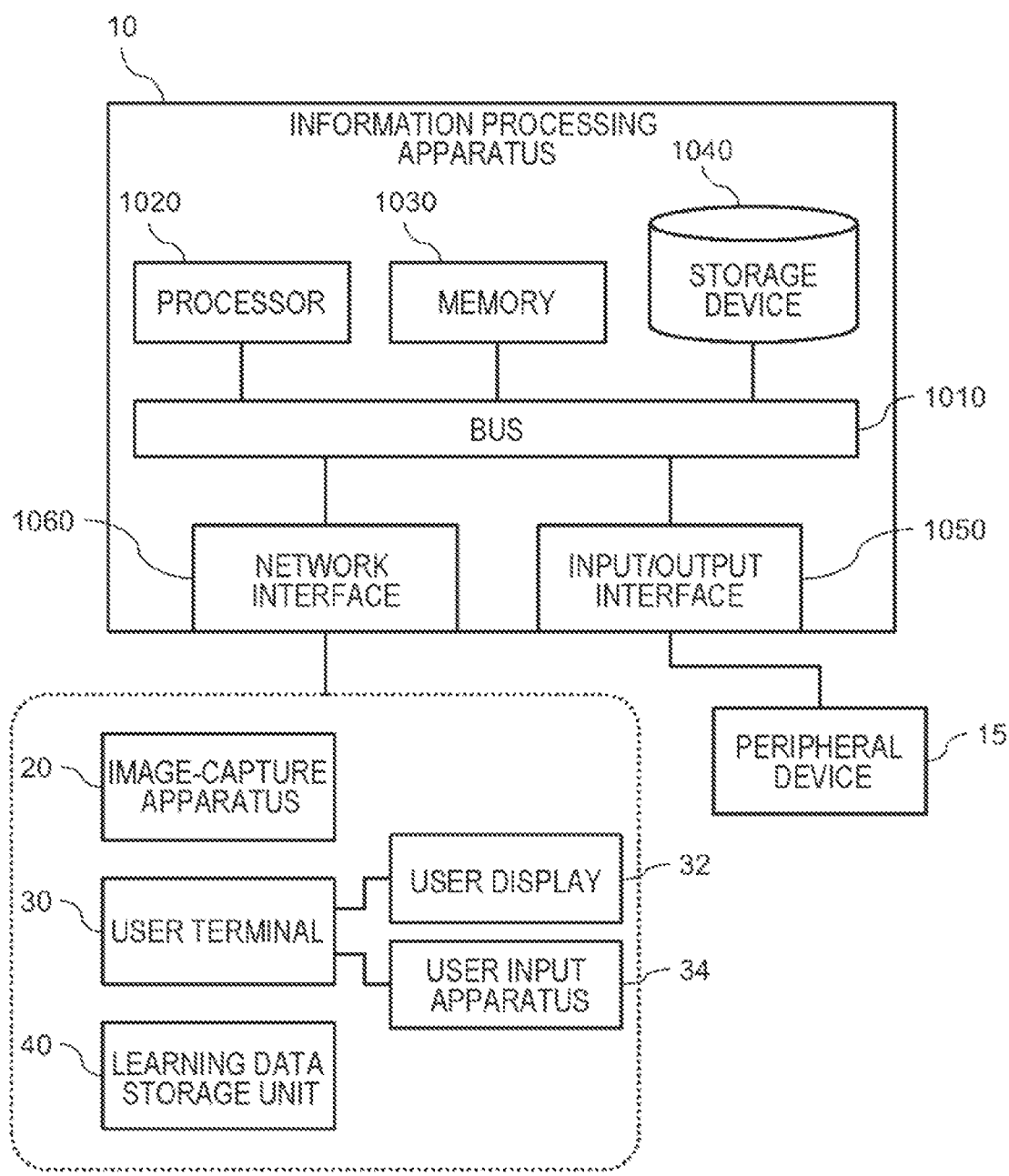
FIG. 2 is a block diagram illustrating a hardware configuration of the information processing apparatus.

FIG. 2 is a block diagram illustrating a hardware configuration of the information processing apparatus 10. As illustrated in FIG. 2, the information processing apparatus 10 includes a bus 1010, a processor 1020, a memory 1030, a storage device 1040, an input/output interface 1050, and a network interface 1060.

The bus 1010 is a data transmission path where the processor 1020, the memory 1030, the storage device 1040, the input/output interface 1050, and the network interface 1060 mutually transmit/receive data. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (the event detection unit 110, the input reception unit 120, the processing execution unit 130, and the like) of the information processing apparatus 10. The processor 1020 reads each of the program modules onto the memory 1030 and executes each program module, and thereby achieves each function relevant to each program module.

The input/output interface 1050 is an interface for connecting the information processing apparatus 10 and the peripheral device 15. The peripheral device 15 includes, for example, an input device such as a keyboard, a mouse, and the like, and an output device such as a display (touch panel display), a speaker, and the like.

The network interface 1060 is an interface for connecting the information processing apparatus 10 to a network. The network is, for example, a local area network (LAN) and a wide area network (WAN). A method of connection to a network by the network interface 1060 may be wireless connection or wired connection. The information processing apparatus 10 is communicably connected, via the network interface 1060, to an external apparatus such as the image-capture apparatus 20, the user terminal 30, and the learning data storage unit 40.

The image-capture apparatus 20 is, for example, a camera mounted with a charge coupled device (CCD) image sensor or a complementary metal oxide semiconductor (CMOS) image sensor. The event detection unit 110 can acquire, via the network interface 1060, video data generated by the image-capture apparatus 20. The user terminal 30 is a terminal used by a person (user) executing a check operation for an image generated by the image-capture apparatus 20. The user terminal 30 is, but not specifically limited to, a stationary personal computer (PC) or a mobile terminal (a smartphone, a tablet terminal, or the like). The user terminal 30 includes the user display 32 for displaying video data and an analysis result of the video data based on the event detection unit 110 and a user input apparatus 34 that receives an input operation of a user. Information (action information) indicating an action performed, by a user, by using the user input apparatus 34 is transmitted to the input reception unit 120 via the network interface 1060. The learning data storage unit 40 includes a storage apparatus such as an HDD, an SSD, a flash memory, and the like. Learning data of machine learning generated as a result of the above-described second processing are transmitted to the learning data storage unit 40 via the network interface 1060.

Note that, the configuration illustrated in FIG. 2 is merely one example, and a configuration of hardware including the information processing apparatus 10 is not limited to the example in FIG. 2. For example, the storage device 1040 of the information processing apparatus 10 may function as the learning data storage unit 40 that stores learning data acquired as a result of the above-described second processing. In this case, the learning data storage unit 40 may not necessarily exist externally. Further, when call processing for a communication device used by a person or the like performing a security operation at a site where the image-capture apparatus 20 is installed or processing of ringing an alarm provided at the site is included in the first processing, the communication device and the alarm can be connected to the information processing apparatus 10 via the network interface 1060.

<Flow of Processing>

Figure 3:
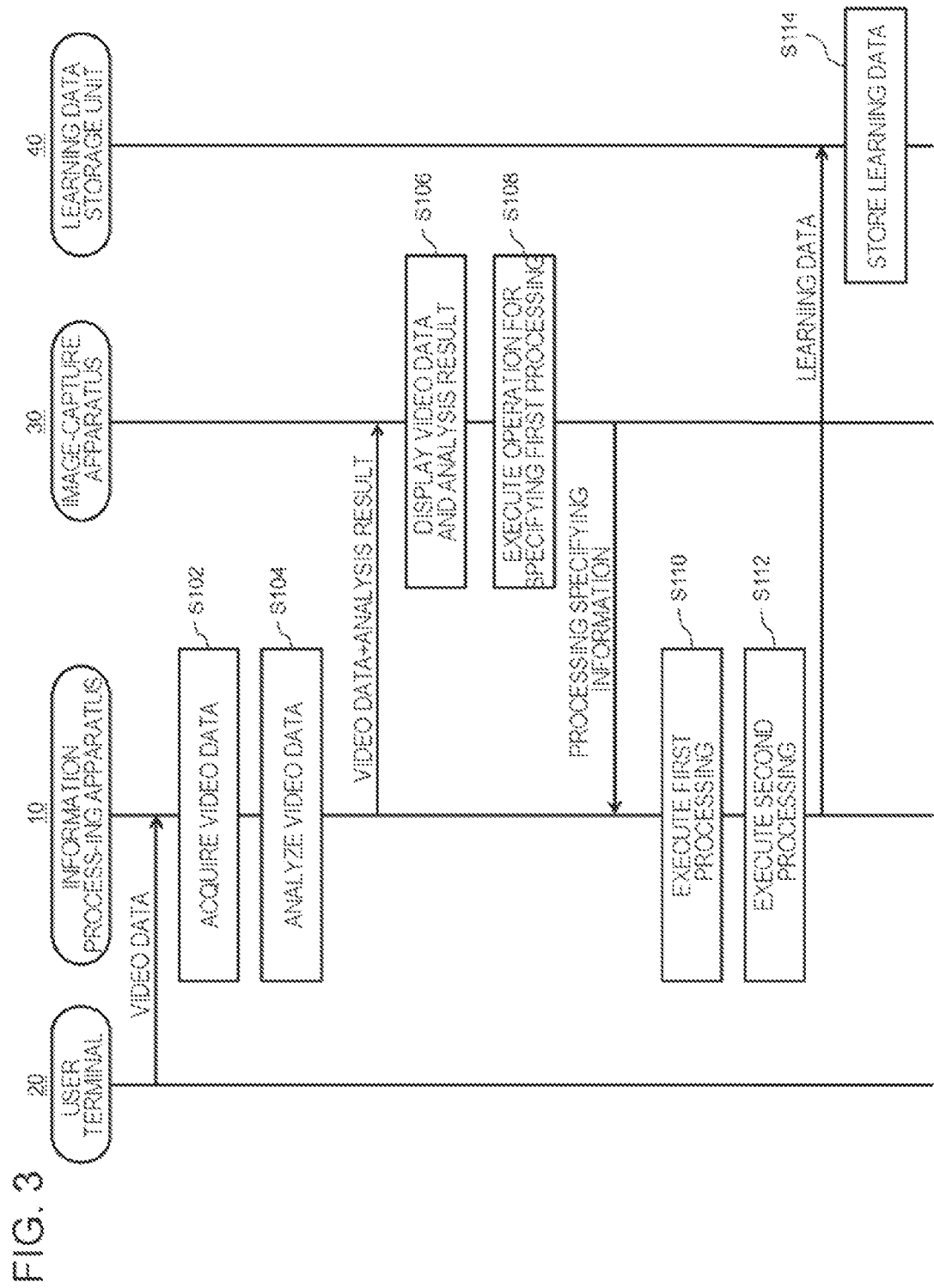
FIG. 3 is a sequence diagram illustrating a flow of processing according to the first example embodiment.

By using FIG. 3, a flow of processing executed according to the present example embodiment is described. FIG. 3 is a sequence diagram illustrating a flow of processing according to the first example embodiment.

First, the event detection unit 110 acquires one or more frame images (video data) generated by the image-capture apparatus 20 (S102). Then, the event detection unit 110 analyses, by using a known image analysis method, the video data acquired from the image-capture apparatus 20 and detects a specific event from the video data (S104). The event detection unit 110 analyses video data, for example, by using a discriminator constructed by executing machine learning such as deep learning, a support vector machine (SVM), and the like, and thereby can discriminate whether a specific event is present or absent in the video data. The information processing apparatus 10 transmits, to the user terminal 30, video data generated by the image-capture apparatus 20 and an analysis result of the video data based on the event detection unit 110.

The user terminal 30 displays, on the user display 32, the video data and the analysis result of the video data acquired from the information processing apparatus 10 (S106). A user checks a content (a detection result of a specific event based on the event detection unit 110) displayed on the user display 32 and executes, by using the user input apparatus 34, an operation for specifying first processing to be executed (S108). When, for example, it can be determined that the detection result of a specific event based on the event detection unit 110 is correct, the user executes an execution operation such as call processing for a communication device carried by a person performing a security operation at a site or a person in a predetermined department in charge, transmission processing of a message to the communication device, and the like. Further, when it can be determined that the detection result of a specific event based on the event detection unit 110 is incorrect, the user executes an execution operation (e.g., an operation for pressing a button for cancelling the detection result of a specific event based on the event detection unit 110) for processing of returning to a mode of detecting a specific event, or the like. The user terminal 30 generates processing specifying information in response to an operation of a user received via the user input apparatus 34 and transmits the generated information to the information processing apparatus 10. The input reception unit 120 of the information processing apparatus 10 executes first processing and second processing in response to acquisition of processing specifying information.

The processing execution unit 130 determines, based on processing specifying information acquired from the user terminal 30, first processing to be executed and executes the determined first processing (S110). Further, the processing execution unit 130 executes, separately from the first processing, second processing of generating learning data used for machine learning (S112). Note that, in the present figure, the first processing and the second processing are illustrated in such a way as to be executed sequentially, but these pieces of processing may be executed in parallel.

In the second processing, the processing execution unit 130 generates learning data including video data as an analysis target, category information indicating a category of a specific event detected from the video data, and correct/incorrect information indicating whether a detection result of the specific event based on the event detection unit 110 is correct or incorrect. Herein, the processing execution unit 130 can discriminate, for example, by referring to information as illustrated in FIG. 4, whether a detection result of a specific event based on the event detection unit 110 is correct or incorrect. FIG. 4 is a diagram illustrating one example of information for determining, based on first processing specified as processing to be executed, whether a detection result of a specific event based on the event detection unit 110 is correct or incorrect. In FIG. 4, a table for storing information for discriminating each piece of processing and information indicating whether a detection result of a specific event is correct or incorrect in association with each other is illustrated. Information as illustrated in FIG. 4 is previously stored in a storage area (e.g., the memory 1030, the storage device 1040, and the like) accessible by the processing execution unit 130. When, for example, processing specifying information specifying "report processing to a predetermined address" as first processing to be executed is acquired, the processing execution unit 130 can acquire, based on the information as illustrated in FIG. 4, information indicating that a detection result of a specific event based on the event detection unit 110 (i.e., a combination of video data and a category of a specific event detected from the video data) is correct. Then, the processing execution unit 130 can generate learning data including, together with video data as an analysis target and category information, correct/incorrect information indicating that a category of a specific event is correct. Further, when, for example, processing specifying information specifying "processing of returning to a mode of detecting a specific event" as first processing to be executed is acquired, the processing execution unit 130 can acquire, based on the information as illustrated in FIG. 4, information indicating that a detection result of a specific event based on the event detection unit 110 (i.e., a combination of video data and a category of a specific event detected from the video data) is incorrect. Then, the processing execution unit 130 can generate learning data including, together with video data as an analysis target and category information, correct/incorrect information indicating that a category of a specific event is incorrect.

Herein, the processing execution unit 130 may include all video data as an analysis target in learning data or may include a part of video data as an analysis target in learning data. The processing execution unit 130 may be configured in such a way that, for example, in video data as an analysis target, only a partial area (e.g., an area determined by adding, by using an area of a detected specific event as a basis, a predetermined margin width to the area) including a specific event is included in learning data. By doing so, learning data having a less image feature value (noise) being a cause of decreasing accuracy in machine learning can be acquired.

Further, the processing execution unit 130 may execute various pieces of image correction processing for video data to be included in learning data. Image correction processing referred to herein indicates processing in general of improving image quality, for example, such as processing of adjusting color, brightness, contrast, and the like and anti-blur processing.

The information processing apparatus 10 transmits learning data generated in the processing of S112 by the processing execution unit 130 to the learning data storage unit 40. The learning data storage unit 40 stores the learning data acquired from the information processing apparatus 10 in a storage area (S114).

Advantageous Effects

As described above, according to the present example embodiment, when a user executes, based on an analysis result of video data (a detection result of a specific event), a specified operation for first processing, the first processing specified by the operation is executed and second processing of generating learning data used for machine learning is separately executed. The second processing generates learning data including, at least, at least a part of video data as an analysis target, information indicating a category of a specific event detected from the video data by the event detection unit 110, and information indicating whether a detection result of the specific event is correct or incorrect. Note that, it is automatically determined, based on a classification of the specified first processing, whether a detection result of a specific event is correct or incorrect. In other words, according to the present example embodiment, an operation that can be executed by a user in a usual operation is appropriated as an operation for generating learning data used for machine learning. Based on such a configuration enabling to generate and store learning data used for machine learning without intended work of a user, a load of work for generating learning data used for machine learning can be reduced.

Further, according to the present example embodiment, for a system designed for an operation for checking, from video data, whether a specific event is present or absent, suitable learning data can be collected for each system.

Further, according to the present example embodiment, learning data including information indicating that a detection result of a specific event is incorrect can be generated. Such learning data can be used in order to cause a discriminator to learn that an image recognition result is incorrect.

MODIFIED EXAMPLES

Figure 5:
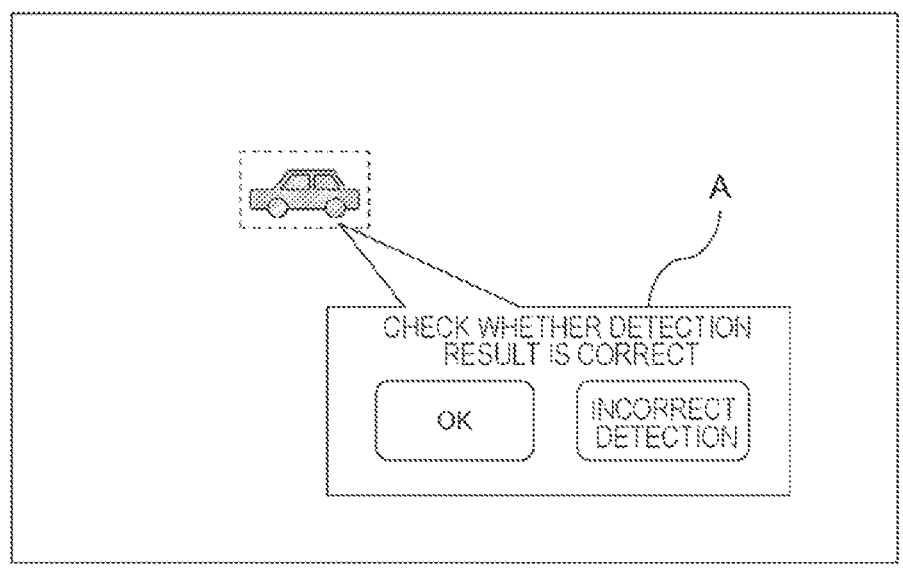
FIG. 5 is a diagram illustrating one example of a display element for causing a user to check a detection result of a specific event based on an event detection unit.

According to the present example embodiment, a part of intended work for generating learning data used for machine learning may be included in an operation usually executed by a user. The event detection unit 110 may together display, when, for example, displaying a detection result of a specific event on the user display 32, a display element for causing a user to check whether the detection result is correct (e.g., FIG. 5). FIG. 5 is a diagram illustrating one example of a display element for causing a user to check a detection result of a specific event based on the event detection unit 110. In the example of FIG. 5, the event detection unit 110 displays a display element A in association with a specific event (a portion surrounded with a dashed line) detected in video data. The display element A illustrated in FIG. 5 includes an "OK" button and an "incorrect detection" button. The "OK" button is a button for reporting, to the information processing apparatus 10, that a detection result of a specific event based on the event detection unit 110 is correct. The "incorrect detection" button is a button for reporting, to the information processing apparatus 10, that a detection result of a specific event based on the event detection unit 110 is incorrect. When either of the buttons is pressed by a user, information indicating the pressed button is transmitted to the information processing apparatus 10. The processing execution unit 130 generates, when receiving information indicating that the "OK" button is pressed by a user, in the second processing, learning data including information indicating that a detection result of a specific event is correct. Further, the processing execution unit 130 generates, when receiving information indicating that the "incorrect detection" button is pressed by a user, in the second processing, learning data including information indicating that a detection result of a specific event is incorrect.

In addition, the processing execution unit 130 may generate, while a detection result of a specific event based on the event detection unit 110 is displayed on the user display 32, information indicating whether a detection result of a specific event is correct or incorrect, based on an analysis result of an uttered voice of a user. Note that in this case, the processing execution unit 130 can collect an uttered voice of a user via a microphone or the like that is not illustrated. The processing execution unit 130 generates, when a predetermined keyword enabling to interpret that a detection result is correct is detected, in the second processing, learning data including, as correct/incorrect information, information indicating that a detection result of a specific event is correct. The processing execution unit 130 generates, when a predetermined keyword enabling to interpret that a detection result is incorrect is detected, in the second processing, learning data including, as correct/incorrect information, information indicating that a detection result of a specific event is incorrect.

Second Example Embodiment

Various objects may be captured in video data. When machine learning is executed by using learning data acquired according to the first example embodiment, it may be possible that an image feature value unrelated to a specific event becomes noise, and accuracy in discriminating a specific event decreases. An information processing apparatus 10 according to the present example embodiment further includes a function for solving the above-described problem.

Functional Configuration Example

The information processing apparatus 10 according to the present example embodiment includes a functional configuration similar to the functional configuration (e.g., FIG. 1) according to the first example embodiment. A processing execution unit 130 according to the present example embodiment is different from the processing execution unit 130 according to the first example embodiment in a point that, in second processing, area information is acquired and the acquired area information is further included in learning data. Area information is information indicating an area (position coordinates of a specific event in video data) where a specific event is detected in video data.

<Flow of Processing>

Figure 6:
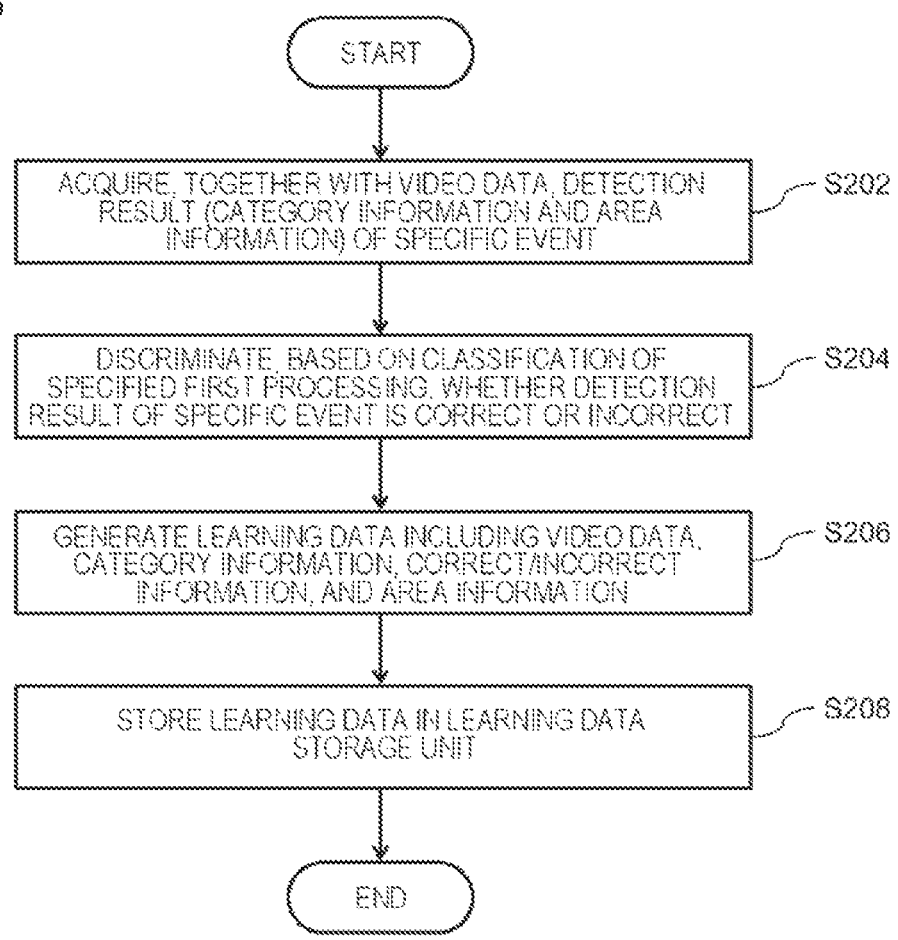
FIG. 6 is a flowchart illustrating second processing executed by a processing execution unit according to a second example embodiment.

Hereinafter, a flow of second processing executed by the processing execution unit 130 according to the present example embodiment is described by using a figure. FIG. 6 is a flowchart illustrating the second processing executed by the processing execution unit 130 according to a second example embodiment.

First, the processing execution unit 130 acquires, together with video data as an analysis target, a detection result of a specific event based on the event detection unit 110 (S202). The event detection unit 110 generates, when analyzing video data and detecting a specific event, as a detection result of the specific event, category information indicating a category of the event and area information indicating an area (position coordinates in video data) where the event is detected in the video data. The processing execution unit 130 acquires video data analyzed by the event detection unit 110, and category information and area information acquired by analyzing the video data.

Further, the processing execution unit 130 discriminates, based on a classification of first processing specified by a user as "processing to be executed", whether a detection result of a specific event is correct or incorrect (S204). Specifically, the processing execution unit 130 acquires, by using information as illustrated in FIG. 4, correct/incorrect information relevant to the specified first processing.

Then, the processing execution unit 130 generates learning data in association with each other among video data as an analysis target, category information of a specific event, and area information indicating a position of the event acquired by processing S202, and correct/incorrect information indicating whether information of a detection result of a specific event is correct or incorrect acquired by processing of S204 (S206). The processing execution unit 130 stores the learning data generated by processing of S206 in the learning data storage unit 40 (S208). Note that, as described according to the first example embodiment, the processing execution unit 130 may include all video data as an analysis target in learning data, or may include a part of video data as an analysis target in learning data. Further, as described according to the first example embodiment, the processing execution unit 130 may execute various pieces of image correction processing for video data to be included in learning data.

As described above, according to the present example embodiment, learning data including area information indicating a detection area (a position on video data) of a detected specific event, in addition to at least a part of video data as an analysis target, category information of the detected specific event, and correct/incorrect information of a detection result of the event, are generated. Area information is included in learning data, and thereby a decrease in accuracy of machine learning due to an image feature value (noise) of an object unrelated to a specific event can be reduced.

Third Example Embodiment

In a case where a person checks, on video data, a detection result of a specific event based on an event detection unit 110, a processing speed (real-time property) is weighed heavily and an image processing algorithm with low accuracy may be used in some cases. A detection error of a specific event that may be generated by an image processing algorithm with low accuracy can be corrected in the brain of the person to some extent. Therefore, only when a person checks, on video data, a detection result of a specific event based on the event detection unit 110, a problem is unlikely to occur even when an image processing algorithm with low accuracy is used. However, according to the second example embodiment, when learning data used for machine learning is generated by directly using a processing result of an image processing algorithm with low accuracy, the leaning data may adversely affect machine learning. When, for example, an error is included with respect to a detected position of a specific event, it may be possible that a computer executes learning by using a feature value of an incorrect area (an area unrelated to a specific event) and as a result, discrimination accuracy of a target specific event is worsened. An information processing apparatus 10 according to the present example embodiment further includes a function for solving the above-described problem.

Functional Configuration Example

The information processing apparatus 10 according to the present example embodiment includes a functional configuration similar to the functional configuration (e.g., FIG. 1) according to the first example embodiment. A processing execution unit 130 according to the present example embodiment is different from the processing execution unit 130 according to the first example embodiment in a point that similarly to the second example embodiment, in second processing, area information is acquired and the acquired area information is further included in learning data. However, according to the present example embodiment, the processing execution unit 130 is different from the second example embodiment in a point that, when area information is acquired, processing of correcting a detection position of a specific event based on the event detection unit 110 is executed. Specifically, the processing execution unit 130 executes processing of correcting an area where a specific event is detected by the event detection unit 110 and acquires area information with respect to the corrected area.

<Flow of Processing>

Figure 7:
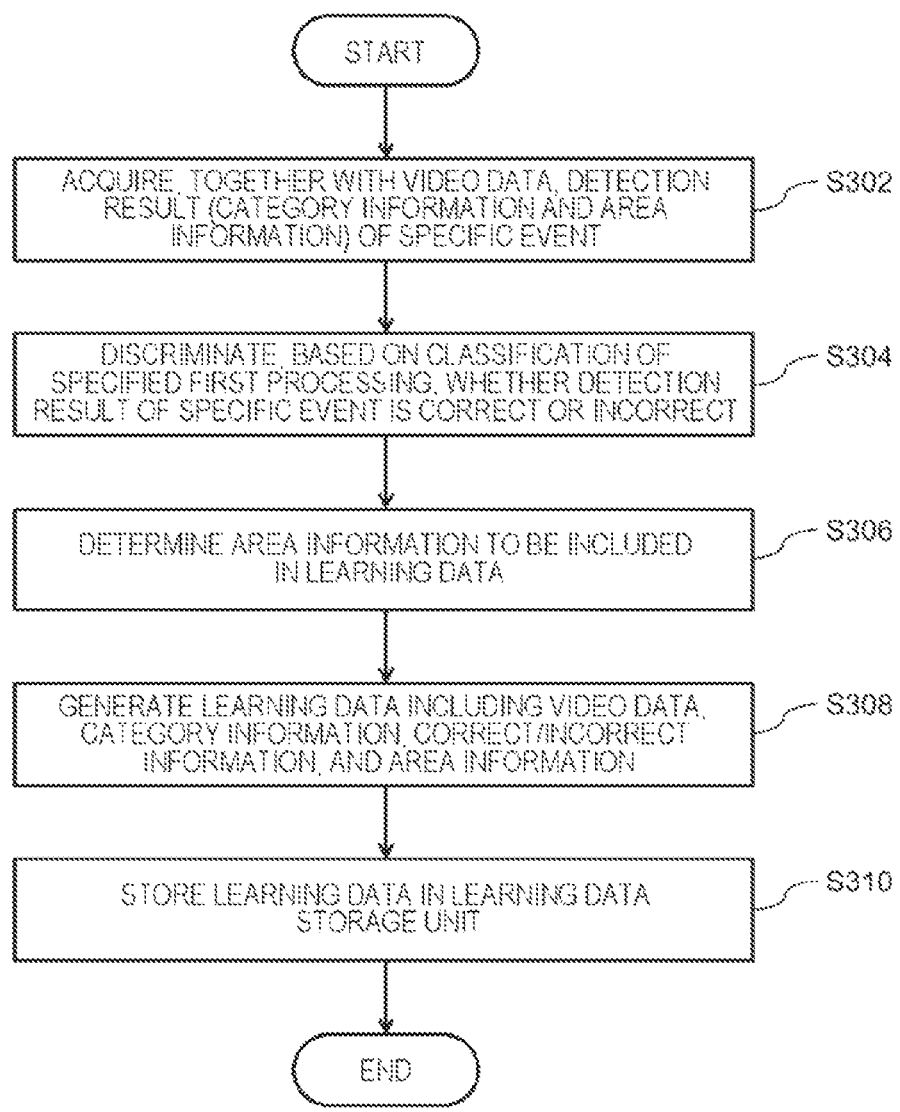
FIG. 7 is a flowchart illustrating second processing executed by a processing execution unit according to a third example embodiment.

Hereinafter, a flow of second processing executed by the processing execution unit 130 according to the present example embodiment is described by using a figure. FIG. 7 is a flowchart illustrating the second processing executed by the processing execution unit 130 according to a third example embodiment.

First, the processing execution unit 130 acquires, together with video data as an analysis target, a detection result of a specific event based on the event detection unit 110 (S302). Further, the processing execution unit 130 discriminates, based on a classification of first processing specified by a user as "processing to be executed", whether a detection result of a specific event is correct or incorrect (S304). Processing of S302 and S304 is the same as the processing of S202 and S204 in FIG. 6.

Figure 8:
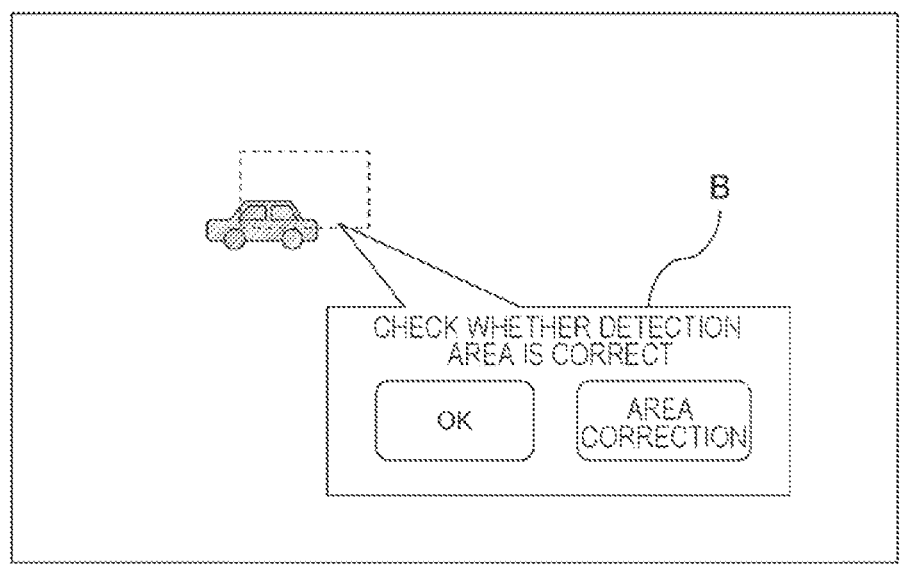
FIG. 8 is a diagram illustrating one example of a display element that prompts input for correcting a detection position of a specific event.

Then, the processing execution unit 130 determines area information to be included in learning data (S306). Herein, the processing execution unit 130 executes processing of correcting a detection position of a specific event based on the event detection unit 110. As one example, the processing execution unit 130 re-computes, by using a second image processing algorithm higher in accuracy than a first image processing algorithm used when the event detection unit 110 detects a specific event, a position of a specific event in video data. Then, the processing execution unit 130 determines, as information to be included in learning data, the area information acquired by re-computation. As another example, the processing execution unit 130 may output a display element (e.g., FIG. 8) that prompts input for correcting a position of a specific event, and acquire, from a user, information for correcting a position of a specific event. FIG. 8 is a diagram illustrating one example of a display element that prompts input for correcting a detection position of a specific event. In the example of FIG. 8, the event detection unit 110 displays a display element B in association with a detection position (a portion surrounded with a dashed line) of a specific event detected in video data. The display element B illustrated in FIG. 8 includes an "OK" button and an "area correction" button. The "OK" button is a button for reporting, to the information processing apparatus 10, a fact that a detection position of a specific event based on the event detection unit 110 is correct. The "area correction" button is a button for starting processing of correcting a gap of a detection position of a specific event based on the event detection unit 110. When either of the buttons is pressed by a user, information indicating the pressed button is transmitted to the information processing apparatus 10. The processing execution unit 130 determines, when receiving information indicating that the "OK" button is pressed by a user, area information acquired by processing of S302 as information used during generation of learning data. Further, the processing execution unit 130 further receives, when receiving information indicating that the "area correction" button is pressed by a user, position specifying input for a specific event by a user. Then, the processing execution unit 130 newly generates area information, based on the position specified by the input of the user, and determines the area information as information used during generation of learning data.

Then, the processing execution unit 130 generates learning data in association with each other among video data as an analysis target and category information of a specific event acquired by processing of S302, correct/incorrect information indicating whether information of a detection result of a specific event is correct or incorrect acquired by processing of S304, and area information indicating a position of a specific event determined by processing of S306 (S308). The processing execution unit 130 stores the learning data generated by processing of S308 in a learning data storage unit 40 (S310). Processing of S308 and S310 is the same as the processing of S206 and S208 in FIG. 6. Note that, as described according to the first example embodiment, the processing execution unit 130 may include all video data as an analysis target in learning data, or may include a part of video data as an analysis target in learning data. Further, as described according to the first example embodiment, the processing execution unit 130 may execute various pieces of image correction processing for video data to be included in learning data.

As described above, according to the present example embodiment, in a case where area information is included in learning data used for machine learning, the area information is corrected in such a way as to correctly indicate an area where a specific even exists in video data. Thereby, an advantageous effect of reducing a decrease in accuracy of machine learning due to an image feature value (noise) of an object unrelated to a specific event can be achieved more reliably than the second example embodiment.

Fourth Example Embodiment

According to the present invention, an event detection unit 110 may be configured in such a way as to be able to detect a plurality of types of specific events from video data. The event detection unit 110 may be configured in such a way as to detect, from video data, a plurality of types of specific events, for example, such as a "double riding motorcycle" and a "motorcycle in a state without helmet wearing". In this case, a plurality of types of specific events may be detected in video data at the same time. In such a case, according to the above-described example embodiments, it is necessary to determine, in order to acquire correct learning data, to what specific event leaning data are related. An information processing apparatus 10 according to the present example embodiment further includes a function for solving the above-described problem.

Functional Configuration Example

The information processing apparatus 10 according to the present example embodiment includes a functional configuration similar to the functional configuration (e.g., FIG. 1) according to the first example embodiment. An event detection unit 110 according to the present example embodiment is configured in such a way as to be able to detect a plurality of types of specific events from video data. Further, an input reception unit 120 according to the present example embodiment further receives, in addition to input for specifying processing to be executed, input for specifying a category of a specific event. In order to distinguish these pieces of input, in the following description, the former is referred to as "first input" and the latter is referred to as "second input". Further, a processing execution unit 130 according to the present example embodiment determines, based on a category specified by second input, category information to be included in learning data.

<Flow of Processing>

Figure 9:
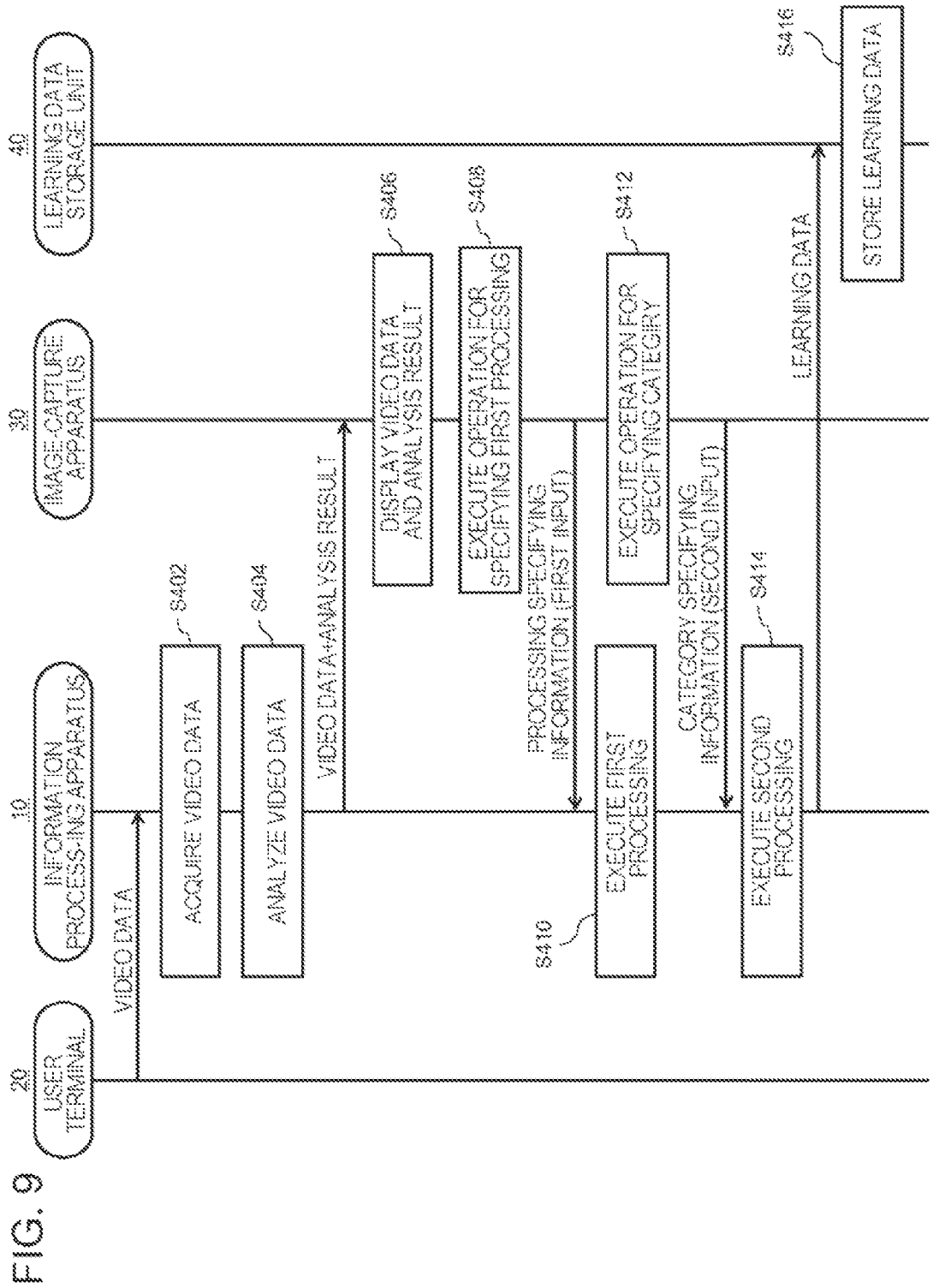
FIG. 9 is a sequence diagram illustrating a flow of processing according to a fourth example embodiment.

Hereinafter, by using FIG. 9, a flow of processing executed according to the present example embodiment is described. FIG. 9 is a sequence diagram illustrating a flow of processing according to a fourth example embodiment.

First, the event detection unit 110 acquires one or more frame images (video data) generated by an image-capture apparatus 20 (S402). Then, the event detection unit 110 analyzes, by using a known image analysis method, the video data acquired from the image-capture apparatus 20 and detects a specific event from the video data (S404). The event detection unit 110 analyses video data, for example, by using a discriminator constructed by executing machine learning such as deep learning, a support vector machine (SVM), and the like, and thereby can discriminate whether a specific event is present or absent in the video data. The information processing apparatus 10 transmits, to a user terminal 30, video data generated by the image-capture apparatus 20 and an analysis result of the video data based on the event detection unit 110.

The user terminal 30 displays, on a user display 32, the video data and the analysis result of the video data acquired from the information processing apparatus 10 (S406). A user checks a content (a detection result of a specific event based on the event detection unit 110) displayed on the user display 32 and executes, by using a user input apparatus 34, an operation (first input) for specifying first processing to be executed (S408). When, for example, it can be determined that the detection result of a specific event based on the event detection unit 110 is correct, the user executes an execution operation such as call processing for a communication device carried by a person performing a security operation at a site or a person in a predetermined department in charge, transmission processing of a message to the communication device, and the like. Further, when it can be determined that the detection result of a specific event based on the event detection unit 110 is incorrect, the user executes an execution operation (e.g., an operation for pressing a button for cancelling the detection result of a specific event based on the event detection unit 110) for processing of returning to a mode of detecting a specific event, or the like. The user terminal 30 generates processing specifying information in response to an operation of a user received via the user input apparatus 34 and transmits the generated information to the information processing apparatus 10. The input reception unit 120 of the information processing apparatus 10 executes first processing in response to acquisition of the processing specifying information (S410).

Figure 10:
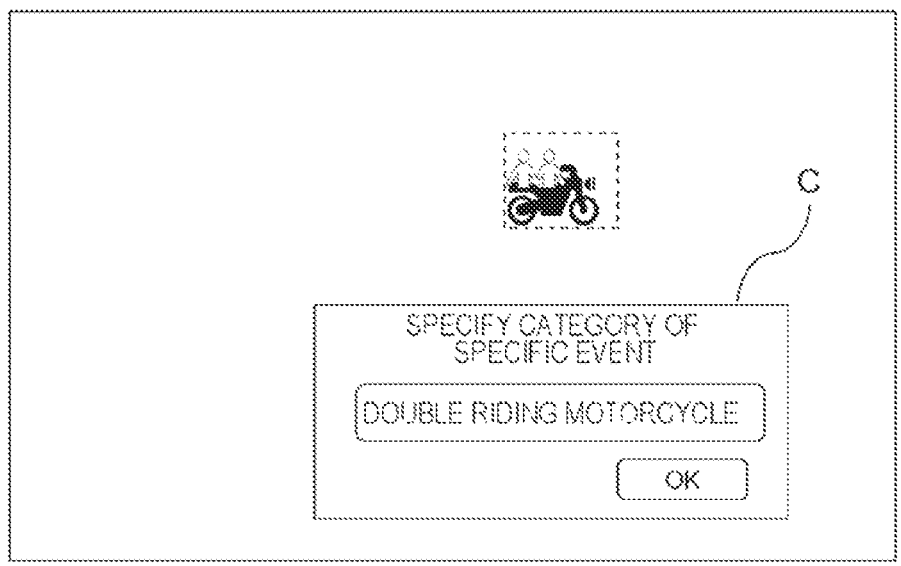
FIG. 10 is a diagram illustrating one example of a display element that receives an operation for specifying a category of a specific event being a target for first processing.
Figure 11:
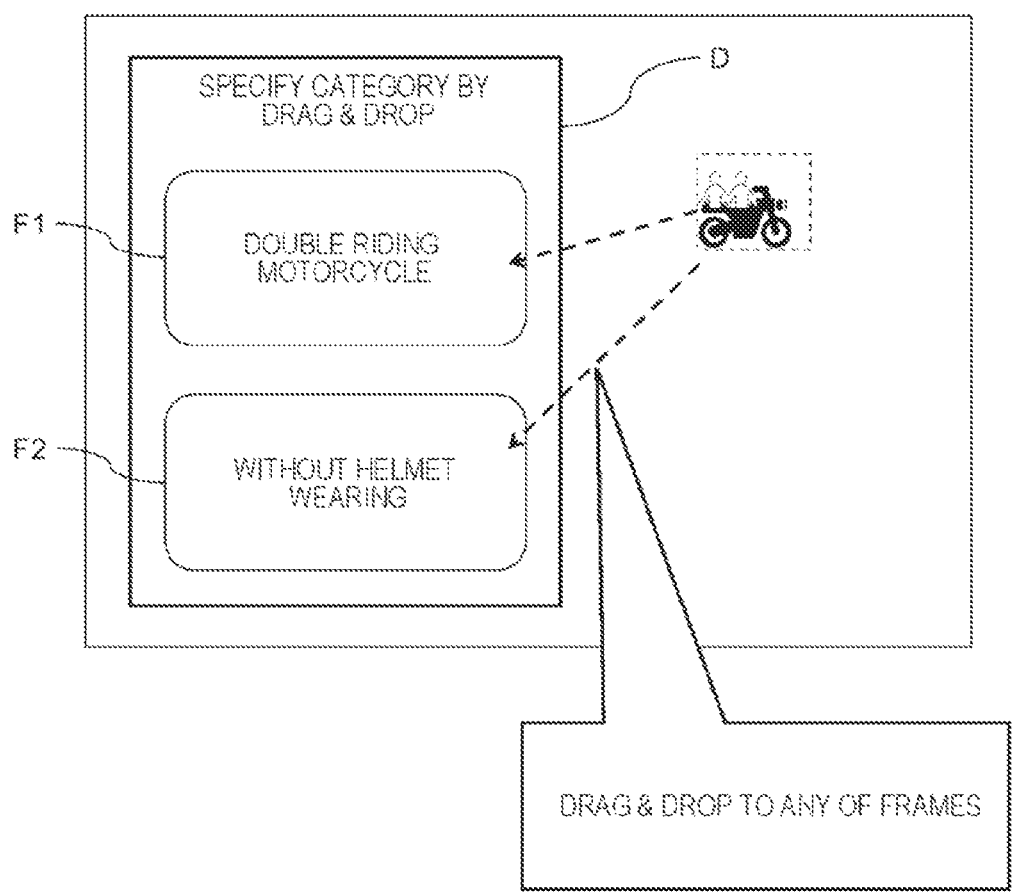
FIG. 11 is a diagram illustrating another example of a display element that receives an operation for specifying a category of a specific event being a target for first processing.

Herein, in a case where, for example, the event detection unit 110 can detect two types of specific events including a "double riding motorcycle" and a "motorcycle in a state without helmet wearing", it is unclear which event a user detects to execute first processing executed in S410. Therefore, in this stage, it is difficult to uniquely determine category information to be included in learning data. Therefore, a user executes, by using the user input apparatus 34, an operation (second input) for specifying a category of a specific event to be a target for the first processing (S412). A user can execute second input, for example, via a display element as illustrated in FIG. 10. FIG. 10 is a diagram illustrating one example of a display element that receives an operation for specifying a category of a specific event to be a target for the first processing. The processing execution unit 130 operates, when detecting acquisition of processing specifying information based on the input reception unit 120, for example, in such a way as to display a display element C illustrated in FIG. 10 on the user display 32. For the display element C, an input form for inputting a category of a specific event is provided. As illustrated in FIG. 10, when a user executes, with respect to a double riding motorcycle, an operation for executing the first processing, a user inputs information indicating a category being a "double riding motorcycle" to an input form of the display element C. Note that, without limitation to the example in the present figure, a display element in which a user selects a previously determined category from a list is usable. Further, a display element in which a frame is included with respect to each category of a specific event and input based on a drag-and-drop operation for a specific event detected on video data to a frame of a target category is received is usable (e.g., FIG. 11). FIG. 11 is a diagram illustrating another example of a display element that receives an operation for specifying a category of a specific event to be a target for the first processing. FIG. 11 illustrates a display element D including a first frame F1 relevant to a category of a "double riding motorcycle" and a second frame F2 relevant to a category of a "motorcycle in a state without helmet wearing". A user can specify a category, as illustrated, by executing a drag-and-drop operation for a specific event detected on video data to a frame of a target category.

The processing execution unit 130 executes, when acquiring second input (category specifying information) specifying a category of a specific event by a user, second processing of generating learning data used for machine learning (S414). Hereinafter, the second processing executed by the processing execution unit 130 according to the present example embodiment is described.

Figure 12:
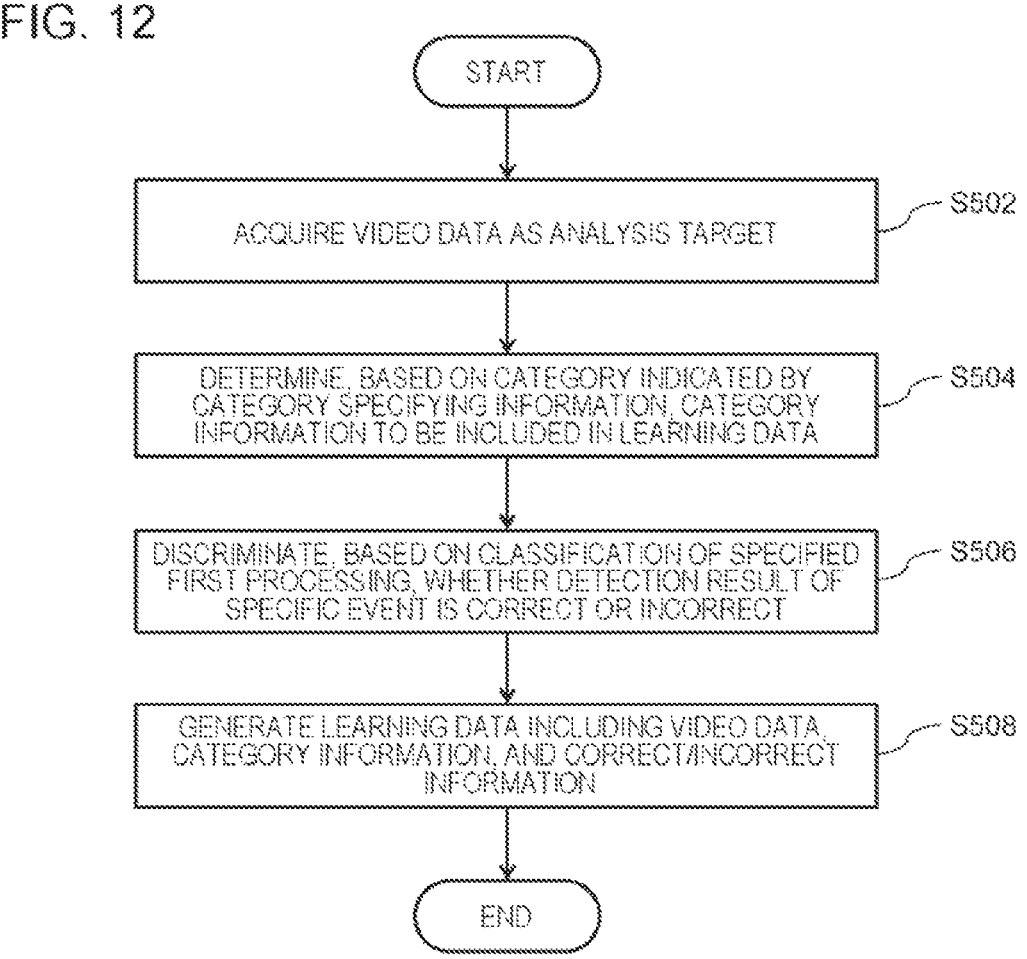
FIG. 12 is a flowchart illustrating second processing executed by a processing execution unit according to the fourth example embodiment.

FIG. 12 is a flowchart illustrating the second processing executed by the processing execution unit 130 according to the fourth example embodiment.

First, the processing execution unit 130 acquires video data as an analysis target (S502). Further, the processing execution unit 130 determines, based on a category indicated by category specifying information acquired in processing of S412, category information to be included in learning data (S504). Further, the processing execution unit 130 discriminates, from processing specifying information acquired in processing of S408, a classification of first processing specified by a user as "processing to be executed", and discriminates, based on the classification, whether a detection result of a specific event is correct or incorrect (S506). Then, the processing execution unit 130 generates learning data including video data as an analysis target acquired in S502, category information acquired in processing of S504, and correct/incorrect information acquired in processing of S506 (S508). Note that, the processing execution unit 130 may acquire, before processing of S508, area information indicating an area of a detected specific event, similarly to the second and third example embodiments. In this case, the processing execution unit 130 generates learning data including video data as an analysis target, category information, correct/incorrect information, and area information. Further, as described according to the first example embodiment, the processing execution unit 130 may include all video data as an analysis target in learning data, or may include a part of video data as an analysis target in learning data. Further, as described according to the first example embodiment, the processing execution unit 130 may execute various pieces of image correction processing for video data to be included in learning data.

By returning to FIG. 9, the information processing apparatus 10 transmits, to a learning data storage unit 40, learning data generated by the processing execution unit 130 in processing of S508. The learning data storage unit 40 stores, in a storage area, the learning data acquired from the information processing apparatus 10 (S416).

As described above, according to the present example embodiment, when a plurality of types of specific events are detected, input (second input) for specifying a category of a specific event having been a target for first processing is executed, and category information to be included in learning data is determined based on the second input. Thereby, even when a plurality of types of specific events are detected, correct learning data can be generated and stored.

While the example embodiments according to the present invention have been described with reference to the drawings, the present invention should not be construed with limitation to the example embodiments and can be subjected to various modifications and improvements, based on knowledge of those of ordinary skill in the art without departing from the gist of the present invention. A plurality of components disclosed according to the example embodiments can form various inventions, based on appropriate combinations. For example, several components may be omitted from all components indicated according to an example embodiment, or components according to different example embodiments may be appropriately combined.

Further, according to the above-described example embodiments, a case where a user is in charge of a surveillance operation using video data generated by a surveillance camera in a town or a building has been specifically described, but the present invention can be applied to an operation other than the example. As specific examples, the present invention can be applied to a payment operation using video data of a product and an inspection operation for a manufactured product using video data of a manufactured product manufactured in a factory and the like. In aa payment operation using video data of a product, the video data are generated by using a camera used when a product is recognized in a store. Further, the event detection unit 110 detects, as a specific event, a product handled in the store from the video data. Further, in this case, first processing includes processing (positive processing) of directly registering the recognized product as a product of a payment target and processing (negative processing) of correcting or deleting a recognition result of a product based on the video data. As another example, in an inspection operation of a manufactured product using video data of a manufactured product manufactured in a factory and the like, the video data are generated by using a camera provided in an inspection line. Further, the event detection unit 110 detects, from the video data, as a specific event, an inspection result (e.g., a discrimination result of a good product/a defective product and a discrimination result of a quality rank) and the like of a manufactured product. Further, in this case, first processing includes processing (positive processing) of directly employing an inspection result of a manufactured product based on image analysis and processing (negative processing) of correcting or deleting an inspection result of a manufactured product based on image analysis.

Further, in a plurality of flowcharts and sequence diagrams used in the above-described description, a plurality of steps (processing) are described in order, but an execution order of steps executed according to each example embodiment is not limited to the described order. An order of steps indicated in these figures can be modified within an extent that there is no harm in content.

What is claimed is:

1. An information processing apparatus comprising:
at least one memory configured to store instructions; and
at least one processor configured to execute the instructions to perform operations, the operations comprising:
detecting a specific event from video data;
receiving, from a user, input for specifying processing to be executed; and
executing first processing specified by the input, and executing second processing of generating learning data used for machine learning and storing the generated learning data in a storage apparatus, wherein
the second processing includes
determining, based on a classification of the first processing specified by the input, whether a detection result of the specific event is correct, and
generating the learning data including at least a part of the video data, category information indicating a category of the detected specific event, and correct/incorrect information indicating whether the detection result of the specific event is correct or incorrect, wherein
the first processing is classified into either positive processing executed by assuming that the detection result of the specific event is correct or negative processing executed by assuming the detection result of the specific event is incorrect, and
the operations comprise, in the second processing:
determining, when the first processing specified by the input is classified into the positive processing, that the detection result of the specific event is correct, and
determining, when the first processing specified by the input is classified into the negative processing, that the detection result of the specific event is incorrect.

2. The information processing apparatus according to claim 1, wherein
the positive processing includes at least any one of report processing to a predetermined address, processing of starting an alarm apparatus, processing of modifying a display area of the video data, processing of selecting a partial area of the video data, processing of starting recording the video data, and processing of stopping recording the video data and storing recorded data, and
the negative processing includes at least any one of processing of returning to a mode for detecting the specific event, and processing of stopping recording the video data and discarding recorded data.

3. The information processing apparatus according to claim 1, wherein the operations further comprise:
detecting, as the specific event, at least any one of a person, an object, and a behavior of a person or an object, matched with a predetermined condition.

4. The information processing apparatus according to claim 1, wherein
the second processing includes:
acquiring area information indicating an area where the specific event is detected in the video data, and
further including the area information in the learning data.

5. The information processing apparatus according to claim 4, wherein
the operations further comprise:
executing processing of correcting an area where the specific event is detected, and
acquiring the area information with respect to the corrected area.

6. An information processing apparatus comprising:
at least one memory configured to store instructions; and
at least one processor configured to execute the instructions to perform operations, the operations comprising:
detecting one or more specific events from video data;
receiving, from a user, input for specifying processing to be executed; and
executing first processing specified by the input, and executing second processing of generating learning data used for machine learning and storing the generated learning data in a storage apparatus, wherein
the second processing includes:
determining, based on a classification of the first processing specified by the input, whether a detection result of the specific event is correct, and
generating the learning data including at least a part of the video data, category information indicating a category of each detected specific event, and correct/incorrect information indicating whether the detection result of each specific event is correct or incorrect, wherein the operations further comprise:
when two or more specific events different in category from each other are detected,
further receiving in addition to the input for specifying the processing to be executed, second input for specifying the category of each specific event, and
determining, in the second processing, based on the category specified by the second input, the category information to be included in the learning data.

7. An information processing method executed by a computer, comprising:
detecting a specific event from video data;
receiving, from a user, input for specifying processing to be executed; and
executing first processing specified by the input, and executing second processing of generating learning data used for machine learning and storing the generated learning data in a storage apparatus, wherein the second processing includes:
: determining, based on a classification of the first processing specified by the input, whether a detection result of the specific event is correct, and
: generating the learning data including at least a part of the video data, category information indicating a category of the detected specific event, and correct/incorrect information indicating whether the detection result of the specific event is correct or incorrect, wherein the first processing is classified into either positive processing executed by assuming that the detection result of the specific event is correct or negative processing executed by assuming the detection result of the specific event is incorrect, and the computer, in the second processing,
: determines, when the first processing specified by the input is classified into the positive processing, that the detection result of the specific event is correct, and
: determines, when the first processing specified by the input is classified into the negative processing, that the detection result of the specific event is incorrect.

8. The information processing method according to claim 7, wherein
: the positive processing includes at least any one of report processing to a predetermined address, processing of starting an alarm apparatus, processing of modifying a display area of the video data, processing of selecting a partial area of the video data, processing of starting recording the video data, and processing of stopping recording the video data and storing recorded data, and
: the negative processing includes at least any one of processing of returning to a mode for detecting the specific event, and processing of stopping recording the video data and discarding recorded data.

9. The information processing method according to claim 7, wherein
: the computer detects, as the specific event, at least any one of a person, an object, and a behavior of a person or an object, matched with a predetermined condition.

10. The information processing method according to claim 7, wherein
: the computer, in the second processing,
: : acquires area information indicating an area where the specific event is detected in the video data, and
: : further includes the area information in the learning data.

11. The information processing method according to claim 10, wherein
: the computer
: : executes processing of correcting an area where the specific event is detected, and
: : acquires the area information with respect to the corrected area.

12. An information processing method executed by a computer, comprising:
: detecting one or more specific events from video data;
: receiving, from a user, input for specifying processing to be executed; and
: executing first processing specified by the input, and executing second processing of generating learning data used for machine learning and storing the generated learning data in a storage apparatus, wherein
: the second processing includes:
: : determining, based on a classification of the first processing specified by the input, whether a detection result of each specific event is correct, and
: : generating the learning data including at least a part of the video data, category information indicating a category of each detected specific event, and correct/incorrect information indicating whether the detection result of each specific event is correct or incorrect, wherein
: the computer,
: : when two or more specific events different in category from each other are detected,
: : further receives, in addition to the input for specifying the processing to be executed, second input for specifying the category of each specific event, and
: : determines, in the second processing, based on the category specified by the second input, the category information to be included in the learning data.

13. A non-transitory computer readable medium storing a program causing a computer to execute an information processing method, the method comprising:
: detecting a specific event from video data;
: receiving, from a user, input for specifying processing to be executed; and
: executing first processing specified by the input, and executing second processing of generating learning data used for machine learning and storing the generated learning data in a storage apparatus, wherein
: the second processing includes:
: : determining, based on a classification of the first processing specified by the input, whether a detection result of the specific event is correct, and
: : generating the learning data including at least a part of the video data, category information indicating a category of the detected specific event, and correct/incorrect information indicating whether the detection result of the specific event is correct or incorrect wherein
: the first processing is classified into either positive processing executed by assuming that the detection result of the specific event is correct or negative processing executed by assuming the detection result of the specific event is incorrect, and
: the computer, in the second processing,
: : determines, when the first processing specified by the input is classified into the positive processing, that the detection result of the specific event is correct, and
: : determines, when the first processing specified by the input is classified into the negative processing, that the detection result of the specific event is incorrect.

14. A non-transitory computer readable medium storing a program causing a computer to execute an information processing method, the method comprising:
: detecting one or more specific events from video data;
: receiving, from a user, input for specifying processing to be executed; and
: executing first processing specified by the input, and executing second processing of generating learning data used for machine learning and storing the generated learning data in a storage apparatus, wherein
: the second processing includes:
: : determining, based on a classification of the first processing specified by the input, whether a detection result of each specific event is correct, and
: : generating the learning data including at least a part of the video data, category information indicating a category of each detected specific event, and correct/incorrect information indicating whether the detection result of each specific event is correct or incorrect, wherein the computer, when two or more specific events different in category from each other are detected, further receives, in addition to the input for specifying the processing to be executed, second input for specifying the category of each specific event, and determines, in the second processing, based on the category specified by the second input, the category information to be included in the learning data.

* * * * *